United States Patent [19]
Butler

[11] 3,791,192
[45] Feb. 12, 1974

[54] PARTICLE STANDARD AND CALIBRATION METHOD

[75] Inventor: John V. Butler, Newhall, Calif.

[73] Assignee: Lockheed Aircraft Corporation, Burbank, Calif.

[22] Filed: July 3, 1972

[21] Appl. No.: 268,852

[52] U.S. Cl. .................................. 73/1 R, 221/226
[51] Int. Cl. .......................................... G01n 15/00
[58] Field of Search........ 73/1 R; 133/8 C; 221/226; 53/254, 26

[56] References Cited
UNITED STATES PATENTS

| | | | |
|---|---|---|---|
| 2,320 | 10/1841 | Tyler | 133/8 C |
| 1,037,405 | 9/1912 | Abbott | 53/254 |
| 3,048,132 | 8/1962 | Morgan et al. | 221/266 |
| 1,084,569 | 1/1914 | Batdorf | 53/254 |

*Primary Examiner*—S. Clement Swisher
*Attorney, Agent, or Firm*—George C. Sullivan; Frank L. Zugelter

[57] ABSTRACT

Apparatus and method for establishing an absolute particle calibration standard useful for fluid contamination control and like applications. A soluble carrier releasably secures a known number of standard size particles (microbeads) in a geometric array, which serves as the reference standard. The carrier may be selectively dissolved to release the standard particles into the system to be tested or calibrated. The reference standard is manufactured by introducing solid particles of known size, or within a given size range, into a precisely-dimensioned metering slot or groove which constrains a predetermined number of the particles in the desired array. Examination by microscope or other suitable means verifies the count of the standard particles. The geometry of the array facilitates visual counting. A soluble adherent carrier medium is applied to the arrayed particles, after which the carrier and the adhered particles may be removed from the metering slot and transported as an integral set.

58 Claims, 18 Drawing Figures

PATENTED FEB 12 1974

FIG. 14
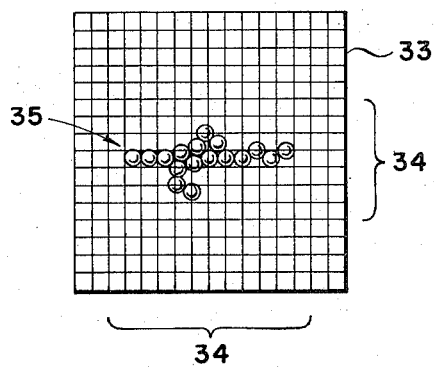
FIG. 15
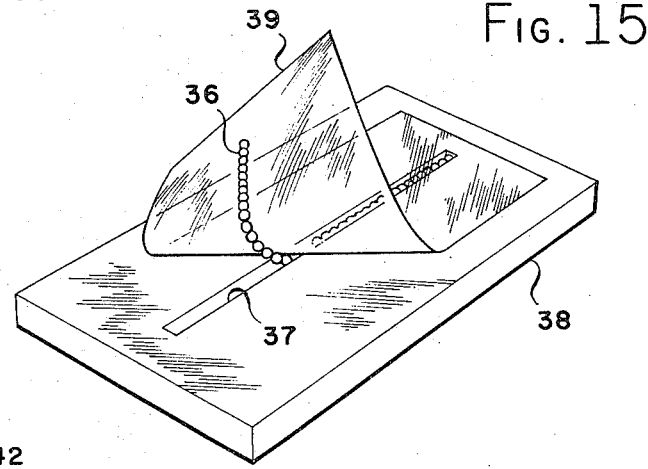
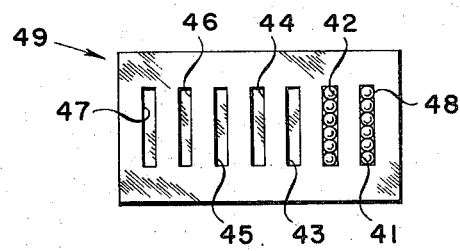
FIG. 16
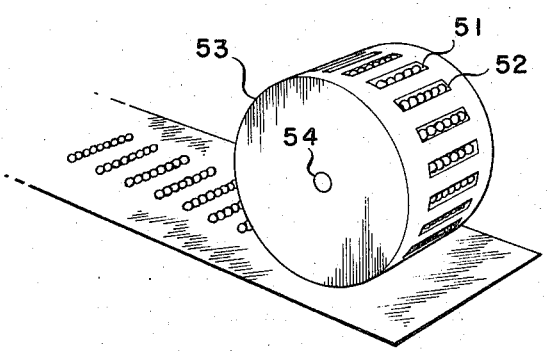
FIG. 17
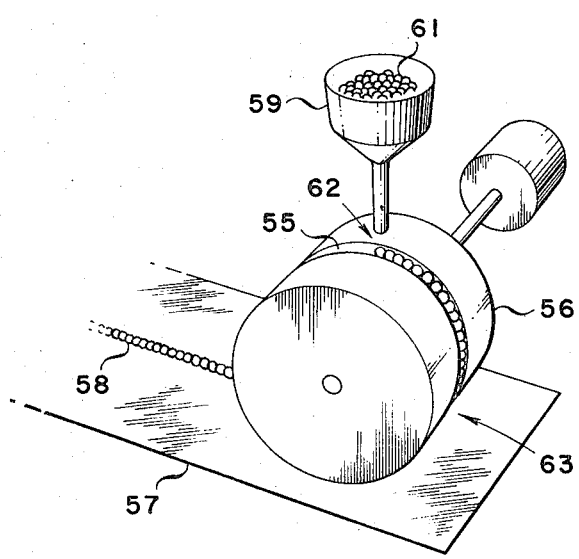
FIG. 18

PARTICLE STANDARD AND CALIBRATION METHOD

BACKGROUND OF THE INVENTION

1. Field of the Invention

This invention relates to means and methods for determining the quantity and/or sizes of very small particles in a fluid medium. The particle carrying media may include liquids, gases, aerosols, and the like.

2. Description of the Prior Art

Examples of prior inventions in the art to which this invention generally relates are shown and described in U.S. Pat. Nos. 2,085,007; 2,473,765; 2,656,508; 2,896,078, 2,985,830; 3,084,592; 3,416,361; and 3,492,396.

PROBLEMS OF THE PRIOR ART

Heretofore, methods utilized for the purpose of determining the quantity or size ranges of particles in a fluid medium have provided results which varied as much as by a factor of 6, depending upon the nature of the procedures used and the skill of the personnel carrying out the measurement.

A typical prior art procedure for measuring the level of particle contamination in a hydraulic system entails removal of a 100 cc bottled sample from the system, filtering the contaminant onto a grid-ruled membrane and visually counting the particles into several size categories through the use of a microscope. As might be expected, this method is costly, inefficient, and inaccurate in view of the widely varying results.

A recommended aeronautical practice (ARP 598) published by the Society of Automotive Engineers sets out a procedure for the determination of particulate contamination of hydraulic fluids by the above-mentioned particle count method. This practice is at best arbitrary and the results from use of such practice vary widely in accuracy of count. Furthermore, the calibration of the equipment used in such procedure is likewise arbitrary and relative, as it will vary from test-to-test, depending upon the initial set-up and operation of the equipment, and its use by the personnel making the determination.

It has become apparent at this stage of advancement in the pertinent art, that approved methods of sample withdrawal, laboratory filtering onto a grid-ruled membrane, and visual counting of particles by size and quantity using a microscope are subject to gross errors. The conscientious operator has no means of objectively judging his ability to obtain accurate results. The use of automatic particle counters has practical limitations, as the operator has no reference standard or other means of judging the absolute accuracy of the resultant particle count. In regard to the recommended practices currently in use in the aircraft industry with regard to controlling hydraulic system contamination, the procedures used are costly and produce inconsistent and controversial results, even with adoption and practice under the APR 598 mentioned above.

Further, heretofore, no known absolute particle calibration standard to which reference may be made has ever been developed in the area of microscopically small, but nevertheless discrete, particles to be found in fluids. Devices have been developed to scan and count particles in the micron-size range, for various purposes, such as are disclosed in the Coulter patents indicated above (U.S. Pat. Nos. 2,656,508, 2,869,078 and 2,985,830). However, no method for perfecting an absolute standardization has been known prior to this invention, although particles of micron size are known, have been made, and their number have been determined with varying degrees of accuracy.

BRIEF SUMMARY OF THE INVENTION

To overcome the shortcomings and omissions of the prior art discussed above, there is provided by the present invention a novel and improved particle standard comprising a plurality of particles geometrically arrayed in a suitable carrier. The carrier permits the quantity of the particles to be accurately verified and to be easily handled and transported. In a first embodiment the carrier comprises a soluble strip upon which the particles, in the form of microbeads or the like, are adhered or imbedded. The particles may be released into a container, conduit, or fluid stream by dissolving the carrier in a suitable solvent.

The carrier may be either water soluble (in which case a water solvent is used to release the particles), or a hydrocarbon or other organic solvent may be used to dissolve the carrier.

The invention also includes a novel and improved method whereby the calibration particles may be obtained from a bulk source aligned, counted, and transferred to the aforementioned carrier. Typically this method utilizes a microslot which is in the form of a metering slot or groove of a specified geometry formed in a glass sheet or cylinder. The microslot is open on one side and closed on the other, and is closed at each end. A bulk supply of particles is delivered to the metering slot and all excess particles are thereafter mechanically removed. Those particles remaining in the slot adhere to the soluble carrier which is applied to the exposed surface of the member defining the microslot. The carrier, plus the particles, is then physically separated from the slot-defining member.

The method of the invention includes the release of the carrier-mounted particles into the test environment.

The metering chamber preferably takes the form of an elongated slot suitably formed in one surface of a glass member. The accurately counted particles disposed along the length of the slot constitutes the basic calibration standard. This array or set of counted particles is removed from the metering slot and transferred into the system to be calibrated. Alternatively, the set may be transverred to a sampling bottle containing a known volume of a liquid of known cleanliness or contamination level. Thus, the bottled liquid with such particles may constitute a fluid contamination standard.

It is therefore an object of this invention to provide a novel or improved absolute particle calibration standard.

Another object of this invention is to provide a calibration sample for use in the testing of fluid cleanliness or contamination.

Yet another object of this invention is to provide a novel and efficient technique for controlling and counting exact numbers of very small discrete particles.

Still another object of this invention is the provision of a novel or improved technique for calibrating an automatic particle counter, and thereby effect or achieve a true value of the number of discrete particles of a given size or range of sizes passing through the counter.

A further object of this invention is the provision of novel or improved testing means and methods for testing either cleanliness or contamination a timed quantity of fluid in a fluid or hydraulic system without the necessity of removal of such fluid from the system, or of any manual handling thereof, and returning the fluid to the system after such testing.

A still further object of the invention is to eliminate inaccurate particle counts which heretofore have been regularly observed and practiced in manual and automatic particle counting and laboratory techniques.

It is an object of the invention to provide a novel or improved particle reference calibration fluid sample.

Another object of the invention is to provide an accurate and true calibration for an automatic particle counter by application of a particle reference calibration fluid sample thereto.

A further object of the invention is to provide an efficient, facile, and inexpensive procedure by which cleanliness or contamination of a fluid may be ascertained through the use of a sample of a fluid, of a given volumentric measurement, containing a known number of particles of known size or size range.

A further object of this invention is to provide a novel or improved article of manufacture having an accurately counted number of discrete particles therein which may be commercially packaged for subsequent use as a calibration standard.

It is yet another object of the invention to provide a commercially packaged article of manufacture containing an accurately counted number of discrete particles suitable for calibration purposes.

These and other objects, features, and advantages of the present invention will become manifest to those versed in the art upon making reference to the detailed description and the accompanying sheets of drawings in which preferred structural embodiments, incorporating the principles of the present invention, are shown by way of illustrative examples.

BRIEF DESCRIPTION OF THE DRAWINGS

FIG. 14 illustrates another embodiment of a measuring element suitable for use in practice of the invention.

FIG. 15 is a perspective view illustrating a method by which an accurate number of particles may be prepared for subsequent commercial packaging.

FIG. 16 is a top plan view of an alternate embodiment of a microslot slide having a plurality of microslots.

FIG. 17 is a perspective view illustrating a first cylindrical embodiment of a microbead measuring element.

FIG. 18 is a perspective view illustrating a second embodiment of a cylindrical microbead measuring element.

DESCRIPTION OF THE PREFERRED EMBODIMENTS

Figure 1:
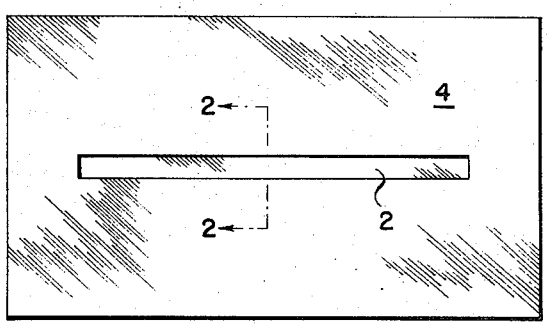
FIG. 1 is a top plan view of a microslot slide constructed in accordance with the invention.

Referring to the drawings, in which like reference numbers correspond to like parts, FIGS. 1 through 6 illustrate a slot-defining element or microslot slide 1 suitable for practicing the invention. It is preferred that slide 1 comprise a planar glass member, similar to a conventional microscope slide, having a groove or slot 2 located in the upper surface 4 thereof. Slot 2 comprises a precisely defined groove cut or ruled in the glass slide 1 by means of a diamond scriber or other suitable means. This slot (2) constitutes a precisely defined measuring receptacle for receiving and retaining a plurality of particles or microbeads, a typical one of which is indicated at 3. The particles (3) preferably have uniform characteristics and may, for example, comprise spherical polystyrene beads having a diameter in the range from 1 micron to 200 microns. (i.e., approximately 0.00004 inch to 0.008 inch). The given dimensions of the slot 2 provides a basis for obtaining an accurate count of the total number of particles 3 placed therein. The geometry of slot 2 preferably takes the form of a linear groove, closed at each end, having a given precise length and having a depth slightly greater than the diameter of a particle or particles which are to be introduced therein. The reason for such greater depth of slot 2 is to prevent such particles (3) from being exposed exteriorly of the surface 4 of the slide 1 and thus be susceptible to being accidentally ejected from slot 2. Such ejectment or unwanted removal would make for an inaccurate count of particles, upon subsequent use or practice of the invention.

Figure 2:
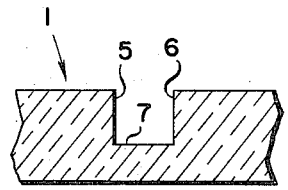
FIG. 2 is a cross sectional view taken along line 2—2 of FIG. 1.
Figure 3:
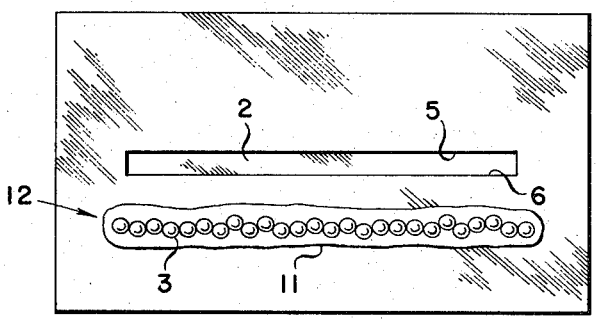
FIG. 3 is a view of the apparatus of FIG. 1 including a plurality of microbeads.

As shown in FIG. 2, the depth of slot 2 is defined by a pair of spaced opposing flat walls 5 and 6 extending downwardly from surface 4 in a perpendicular manner. If desired, a very slight draft angle may be allowed with respect to the perpendicularity of walls 5 and 6, as referenced to bottom wall 7. In such case the cross section of the slot would be trapezoidal with the major width being at the top.

The width of slot 2 is determined by the size of the particles (3) to be placed therein. Preferably, the width of the slot 2 is slightly (viz., fractionally) larger than the diameter of a particle 3 in order to effect as much as possible a contiguous or side-by-side, physically-touching, relationship, of the plurality of particles (3) to be received therein. Such width is preferably provided by means of a defining flat bottom wall 7 connecting together the interior ends of spaced flat walls 5 and 6. Thus, the opening (2) retains the particles (3) within and throughout its entire length, in the manner shown in FIGS. 4 and 5. This pattern or arrangement of particles (3), preferably provided by the aforementioned configuration of an elongated slot, provides a known volume which results in an accurate count of the total number of particles in slot 2. However, the classification of the particles of, say, micron size, involves special problems which must be considered in obtaining the desired geometric arrangement of the particles.

It should be appreciated that in view of their extreme smallness, particles of this nominal size, for commercial purposes, are in many instances actually classified according to a range of sizes rather than classified according to a particular size (diameter). As a practical matter, there is no guarantee that the diameter of one particle in a given class or range of such minute particles substantially corresponds to the diameter of another particle in the same class or range. For example, commercially obtainable particles may be generally classified in ranges such as 5–15$\mu$, 16–25$\mu$, 26–50$\mu$, 51–100$\mu$, and over 100$\mu$. Notwithstanding the fact that a 15$\mu$ particle is three times the size of a 5$\mu$ particle, they are commercially classified in the same range; a 24$\mu$ particle is 1½ times the size of a 16$\mu$ particle but nevertheless classified in the same range. And so on. While it has been found that commercially producible particles of one micron or less are generally uniform in size, those which are nominally in the size range of 10–20 microns average 13.5 microns in size (measurement being made by occupation) but with a greater angstrom deviation than in the case of the 1-micron size, or less, particles.

Consequently, in practicing this invention it is important to note that the diameter of one particle may not necessarily have the approximately the same diameter as its contiguously disposed particle in slot 2. Furthermore, it is theoretically possible to have a number of particles abreast of, or overlapping, each other. For example, in a slot 2 having a width of 15$\mu$; there may be three overlapping particles of a nominal size in the range of 5–15$\mu$; two 10$\mu$ particles may be abreast of each other in a slot having a width of 20$\mu$. Obviously, this condition is unsuitable in achieving the objectives of this invention. As a result, the shape and accuracy of the elongated slot 2 is of great importance to the achievement of the invention. Specifically, the width of slot 2 must never exceed twice the diameter of the nominal particle size for which the slide 1 is prepared, and obviously, this dimension should be a good deal less. In the second instance, that of a given size range of particles, the width of slot 2 must be slightly larger than the largest particle size of the range. Even though this latter parameter allows the above-noted theoretical possibility of particles being abreast of or overlapping each other, and thus rolling past one another in slot 2, it provides for a width of slot 2 as wide as the largest particle in a given size range. Also, it has been found through experience that only in an extremely rare instance will it be found that two micron-range particles, the sum of the diameters of which is less than the width of the slot, come abreast of or overlap each other. Any erratic or uncontrolled movement of one or more particles; i.e., becoming abreast or rolling past each other, and perhaps being counted twice, is of such a small variance that any such variance does not affect the extremely efficient results obtained in the practice of the invention.

For purposes of clarity in describing the preferred embodiments of the invention, slot 2 and particles 3 as illustrated in the FIGURES are greatly exaggerated in relation to the illustrated dimensions of slide 1. That is, this description relates to dimensions of the particles 3 as being of minute or microscopic size. However, it should be understood that the invention is adapted to macroscopic particles as well.

Having defined a physical constraint, in the form of an elongate rectangular slot for receiving and retaining a specified number of particles, it then becomes necessary to provide a means for filling the slot with particles and thereafter selectively removing them. As indicated previously, by reason of their very small size, the particles are highly unmanageable. This accrues, in part, to the fact that they have a propensity to acquire electrostatic charges which cause them to tend to agglomerate or adhere to each other. Also, air currents and other adverse environmental factors may interfere with the handling of the particles. Thus, it becomes desirable to provide a carrier medium to enhance the handling properties of the particles and otherwise facilitate their storage and transfer. Soluble viscous agents of various kinds have been found satisfactory for accomplishing this objective.

Figure 4:
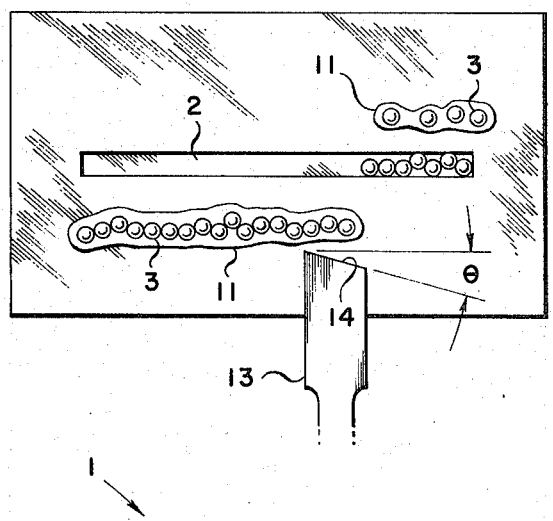
FIG. 4 further illustrates the apparatus of FIG. 3 and the manner of depositing the microbeads into the microslot.
Figure 6:
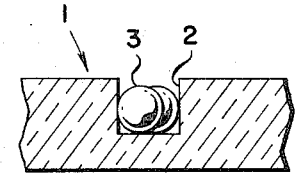
FIG. 6 is a cross sectional view taken along line 6—6 of FIG. 5.
Figure 5:
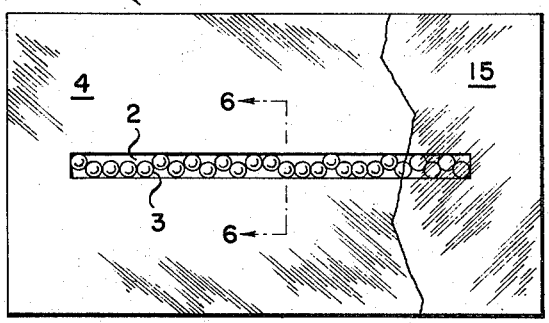
FIG. 5 illustrates the apparatus of FIG. 3 with the microbeads in place.

In one embodiment of the invention, a plurality of minute particles or beads 3 (FIGS. 1–6) is carried by a viscous agent or thixotropic medium 11, to be expeditiously laid upon the surface 4, preferably in parallel fashion to the elongated slot or groove 2, and generally co-extensively along the length of the groove 2. The agent or medium 11 is utilized to restrict and control the movement of a first quantity of particles 12 upon surface 4. The quantity of particles 12, in other words, is combined with the agent 11 prior to introducing them into the slot 2, to facilitate their transfer thereinto. A suitable receptacle (not shown) is employed to hold an indefinite first quantity of particles 12 of uniform shape and size; i.e., of a given diameter, taking into consideration tolerance limits in view of present known commercial practices for establishing classes or ranges of particles of micron and macroscopic size. Any suitable manner for discharging onto slide 1 the conglomeration of the particles 12 and viscous agent 11 from such receptacle may be used. A spoon (not shown) or other similar utensil is workable. Tipping of the opening of such a receptacle onto the surface 4, and the application of a flexible spatula-type knife 13 to draw such conglomeration onto the surface 4 is workable. Thereafter, a suitable utensil, such as spatula 13, is used to manipulate such conglomerate on and about surface 4 and relative to the slot 2, as shown in FIG. 4. Such utensil or spatula 13 preferably includes an edge 14 cut to an angle $\theta$, preferably 25°. The blade 14 is preferably polished to a 0.25 micron r.m.s. finish. The spatula may also be fabricated in the form of an edge of a sheet of material of postcard thickness (not shown) and having a piece of mylar tape wrapped around such edge. The blade edge 14 introduces the conglomeration into slot 2, such as by wiping the first quantity of particles across and into the slot 2. The preferred blade edge 14, being angled in one direction as shown in FIG. 4, facilitates such a push-and-pressing manipulation of the conglomeration. A sliding motion applied to the spatula blade edge 14, across the slot 2, has been found useful to progressively fill to its capacity the length of slot 2, as exemplified by FIGS. 4 and 5.

The excess of the first quantity of conglomeration applied to the glass slide 1 is then carrier past the slot 2 with, say, lens tissue, being careful not to disturb the second quantity thereof, which consists of those particles introduced into the slot. At this point in the procedure, optical examination, such as by a microscope (not shown), is utilized to verify the occupancy of the slot 2, to be assured that the length of the slot 2 is filled; i.e., that the total number of particles 12, which are now arranged in a contiguous linear row or relationship in the slot 2, conforms to an exact given quantity for the length of the slot 2. The length of such slot may be determined by equating it to an integral multiple of the nominal dimension for each of the particles 3. If, upon optical examination, the slot 2 is not completely filled with the particles 12, the above-described manipulation may again be performed, particularly along the longitudinal portion or portions of slot 2 where, under such optical examination, a particle void or voids are observed.

The glass slide 1 and slot 2 are then cleansed of the agent 11. Clean Freon, contained in a wash bottle (not shown) and filtered through, say, an adapter such as a Swinny adapter, has been found to readily perform this task. The Swinny adapter, commercially available from the Millipore Corporation, Bedford, Mass. 01730, comprises a filter membrane made of cellulose materials generally, with a 0.45 micron pore size through which the cleansing liquid discharges. Such discharge upon the glass slide 1 and into the slot 2 washes away the agent 11 therefrom. Thereafter, a clean coverglass 15 (FIG. 5) may be immediately applied upon and held in any convenient manner to surface 4 to protect and maintain the exact given quantity of contiguously-arranged particles 12 in slot 2.

The optical examination for verifying occupancy is the prelude to counting the total number of particles in the slot 2. The counting thereof ascertains the conformance of such slot occupancy with the indicated exact given quantity for a slot of given length.

It should now be apparent that agent 11 constitutes a medium for holding, carrying, temporarily transferring, and introducing the particles 12 in a controlled and reproducible manner to slot 2. This medium may vary with the nature of the material constituting the particles 12, and, of course, of the slide 1. The medium 11 should be soluble in flushing agents, such as Freon or collodion, for example. Although beeswax is not soluble in Freon, it may be useful as agent 11 where other cleansing agents are used. A good grade of glycerine has been found acceptable. A beeswax and olic acid mixture may constitute agent 11. In any event, the medium must be soluble in a compatible solvent as removal of it after obtaining an accurate count of the number of particles 12 in slot 2 is required.

Figure 7:
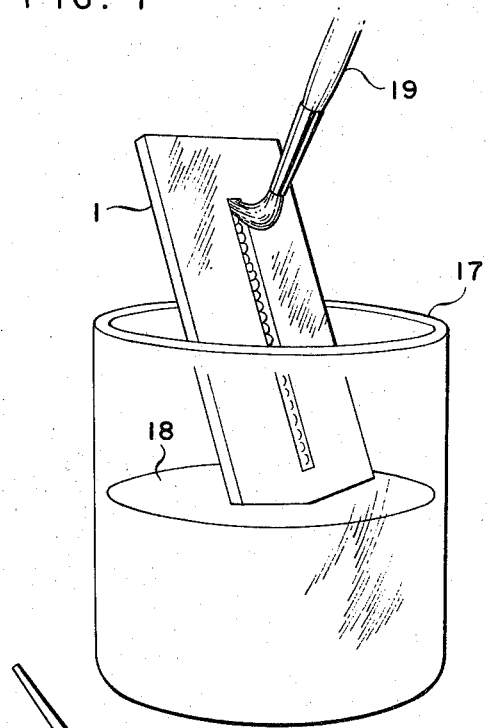
FIG. 7 is a perspective view illustrating a first method of transferring the microbeads.
Figure 8:
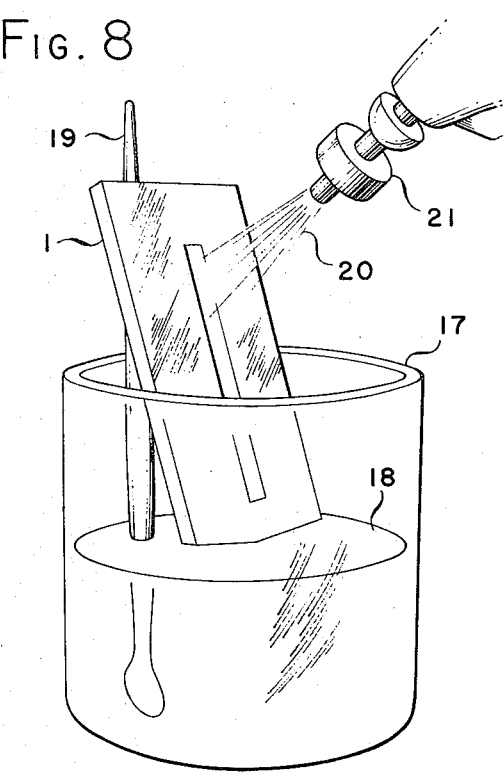
FIG. 8 is a perspective view illustrating a second method of transferring the microbeads.
Figure 9:
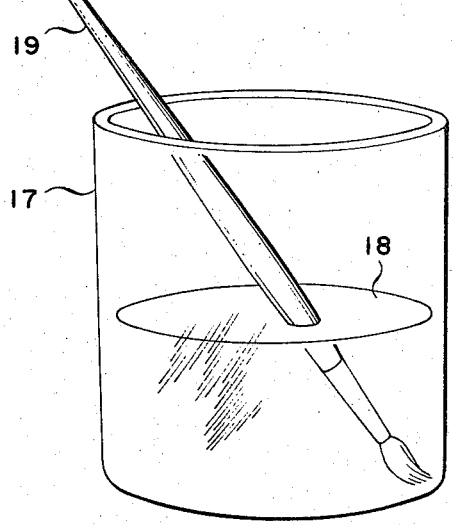
FIG. 9 is a perspective view useful in the exposition of the method of the invention.

The counted particles in slot 2 are now ready for transfer into a receiving container (not shown) of known volume, say, of clean Freon. Such container then may be considered a suitable sample bottle for calibration purposes. The bottled Freon is of a known cleanliness prior to introduction of particles 12 from slot 2. A beaker 17 (FIG. 7) is first cleansed after which it is filled with 50 milli-liters (ml) of clean Freon 18. Coverglass 15 is removed from slide 1 and the composite of slide and particles is then placed into the beaker 17 as shown in FIG. 7. The particles 12 are withdrawn or removed from slot 2 by using downward strokes of the bristles of a No.1 or No.2 sable brush 19. While brush 19 is left in beaker 17, a jet 20 of Freon trichlorotrifluoroethane solvent from say, the Swinny adapter 21, is utilized to flush any remaining particles in slot 2 into beaker 17. Slide 1 is removed and optically examined to ascertain whether all particles 12 have been removed from slot 2. If not, slide 1 is returned to beaker 17, for further massaging by brush 19 or possibly be further flushed by a supply of another jet of Freon gas or fluid 18.

As sable brush 19 is being withdrawn from beaker 17, a jet of Freon gas is utilized to flush off any particles that may remain on its bristles. Brush 19 is then optically examined to assure that no particles 12 have been retained thereon. If so, it is returned to beaker 17 for further flushing of particles 12 thereinto.

We thus now have a sample of fluid of a known cleanliness (contamination) and of a known volume, containing a known number of discrete particles of particulate matter of material. The fluid and particle substances, of course, must be compatible with each other, yet insoluble relative to each other.

Figure 10:
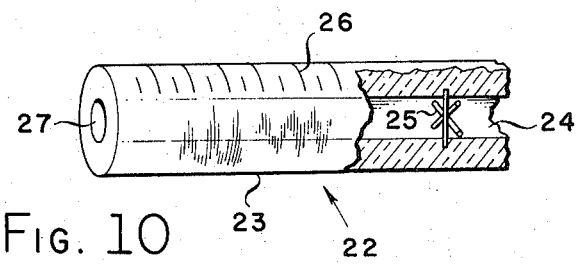
FIG. 10 is a fragmentary perspective view illustrating an alternative embodiment of the microbead measuring receptacle.

FIG. 10 illustrates an article 22, in the form of a tubular element 23; for example, a glass capillary tube, and comprises a bore 24 of a uniform inner diameter equal to the width of the particles to be used and an imbedded braided wire means 25 disposed across such bore 24 at a given point along its length. This point may be conveniently calculated to be at the end of a calibrated length along bore 24, and calibrations along such length may be incorporated into a scale 26 etched into the peripheral surface of element 22. Particles are introduced into bore 24 at its free end 27 by means of attachment of a vacuum pump (not shown) to its other end. After such introduction, free end 27 is covered and an optical examination of the capillary tube assures that there is an accurate count of particles in article 22. For example, in regard to a one-inch calibrated length for bore 24 of article 22, 5,000 particles of a $5\mu$ size would be contiguously and linearly arranged along such 1-inch length. Such article 22 now forms the basis for a calibration standard. Particles therefrom can now be introduced to, say, to a sample bottle having, for example, a $0.45\mu$ cleanliness. The sample of fluid and particles now established in the bottle constitutes an absolute calibration standard.

Figure 11:
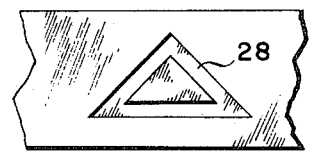
FIGS. 11, 12 and 13 illustrate modified microslot slides suitable for use in and practice of the invention.
Figure 12:
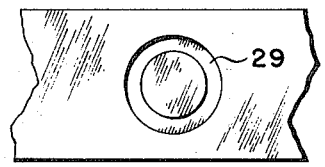
Figure 13:
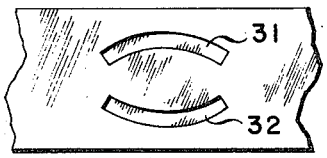

FIGS. 11–13 illustrate various species of the invention in which a retaining groove or chamber for particles 12 provides a standard of known and accurately counted particles.

FIG. 11 illustrates a triangularly-disposed chamber or slot 28; FIG. 12, a circular or other closed loop chamber or slot 29; and FIG. 13, one or a plurality of curvilinearly (including straight) configured chambers or slots 31 and 32. It should be appreciated, of course, that the configuration for such a chamber is not limited to these figurative illustrations as they are intended merely to reflect all available classes of geometric configurations which may be utilized in achieving a standard of a known number of particles.

In the formation of any particular configuration for a chamber or slot, its length is to be determined as precisely as possible, in order to effectuate a subsequent accurate account of particles disposed therein. The length of the slot is equal to the product of the number of particles ($n$) multiplied by the mean diameter ($d$) of such particles. The slot is bounded by end faces, a smooth planar bottom, and uniformly spaced apart side faces, with its breadth and depth being fractionally larger than the mean diameter of the particles. Its geometrical dimensions are not necessarily limited to a rectilinear configuration, but may include a trapezoidal cross-section and other appropriate geometries.

FIG. 14 illustrates an embodiment comprising a screen mesh 33 having an areal section 34 of a known number of open uniform spaces therein. The spaces have specified dimensions for a given sized or range-of-sizes particles 35. These spaces are employed for containing or holding by frictional engagement a plurality of particles 35 which are to completely fill all of such spaces in the section 34 of the article. The particles 35 suitably engage the screen mesh 33 by application of a vacuum pump (not shown) to its one side so as to draw particles from a receptacle (not shown) mounted to its other side. Optical examination verifies total occupancy of the section 34. Initially knowing the total number of open spaces in a given screen section 34, the complete filling thereof provides control of and an accurate count of the total number of particles 35 contained therein.

Thereafter, a water, alcohol, or hydrocarbon soluble carrier (not shown), in the form of an adhesive strip, for example, is applied to the screen mesh 33 to transfer all the particles thereto. The carrier may then be stored in a suitable receptacle for the like for future use.

FIG. 15 illustrates another embodiment of the invention as applied to packaging for commercial or other uses, of particles 36. A selected sized and configured slot 37 is provided in a suitable element 38 (like slide element 2), filled with particles 36, and then counted in the same manner as previously described. A utensil, such as a spatula (not shown), is dipped into a quantity of liquid collodian (or other soluble carrier) which is thereafter spread over the upper surface of element 38 and over the contiguously and linearly arranged particles 36 disposed in slot 37. As the nature of collodian provides a quick drying effect, a tough elastic film 39 develops. Such film 39, with particles 36 enveloped in or adhering thereto, drys, in, say, about two minutes after final deposit of the liquid collodian. After film 39 has dried, the step of verifying the occupancy of the slot 37 may be performed.

The composite slide (38), film (39) and particles (36) may be further processed in one of two ways for commercial purposes. First, this composite may be suitably packaged to constitute a commercially available article of manufacture as a particle standard for use in subsequent fluid calibration purposes and/or for determination of a degree of cleanliness or contamination desired or found in a liquid. Or, secondly, film 39 is detached, stripped or peeled from element 38 (FIG. 15). The quantity of particles 36 embedded in what is now a film strip 39 may be ascertained by optical examination in order to verify the original count. The strip 39 may then be either suitably and conveniently packaged or otherwise stored in means, such as a closed Petri dish which eliminates undesired air bubbles, until ready for commercial sale or actual use.

Thus, the particles are combined with a substantially solid sheet of material for selective retention. The sheet is soluble in a given solvent. Suitable solvents may include hydrocarbons, alcohols, ketones, esters, ethers, and water. A class of particles found to be insoluble therein are substances comprising beads selected from the group comprising glass, synthetic plastic, metal, latex and natural pollen. The particles combine with such sheet to function as a matrix for releasably securing themselves in an ordered geometric pattern. Furthermore, it may be noted that the sheet of material may be transparent or that the particles may be relatively opaque compared thereto, or that the particles provide a contrasting color to such sheet of material. It has been also found that the synthetic beads of uniform diameter and within the 1–100 micron range are suitable.

In an example of use, either composite (elements 38, 36, 39 or merely elements 36, 39) is transferred into a clean unfilled bottle. 10 ml of acetone are added in order to dissolve the dried collodian. A given volume of Freon or hydraulic fluid of known cleanliness or contamination is now added to the bottle to produce a fluid sample ready for calibrating purposes and/or subsequent particle counting.

There is shown in FIG. 16 a modification of the microslot slide wherein a plurality of metering slots 41–47 or grooves are disposed in parallel, side-by-side, relationship rather than a single continuous elongate slot as has been discussed above in connection with FIG. 6. As can be seen in this FIG. 16, slot 41 contains six microbeads (e.g., 48) and adjacent slot 42 also contains six microbeads. Each of the successive parallel slots 41 through 47 each may contain a like number (viz., six) microbeads. Thus, when entirely filled, microslot slide 49 contains 42 microbeads in seven groups of six. Of course other numbers could be established as required. An advantage of this construction over the embodiment described above in connection with FIG. 6 is that it is easier for the operator to count small groups of beads than it is to count say, one hundred beads, in a single row. Also, an incorrect size, a defective or broken bead, or other discrepancy in any given slot is more readily rectified for a short slot containing a few beads than for a long continuous slot containing many beads.

The segmented array concept shown in FIG. 16 and described in the preceding paragraph can be readily adapted to a cylindrical configuration. There is shown in FIG. 17 an embodiment of the invention in which a plurality of parallel slots (e.g., 51,52) or slot segments are disposed about the periphery of the right cylinder 53. This cylindrical configuration permits the slots (51,52) to be revolved about an axis 54 which may be mechanically driven in any suitable manner and incorporated into a system for automatic production. It will be readily understood by those versed in the art that the continuous production apparatus described above in connection with FIG. 16 need not be limited to an embodiment of the invention employing multiple slots disposed in spaced apart parallel relationship. For example, a continuous single groove 55 may be disposed about the periphery of a cylinder 56 as shown in FIG. 18 to yield a continuous strip of carrier media 57 upon which a continuous line of particles 58 is disposed. As can be seen, a supply of microbeads 61 from any suitable source such as hopper 59 is used to fill the slot 55 at the loading station 62. Upon rotation of the cylinder 56, the filled slot 55 is brought into juxtaposition with the receiving carrier film 57. At the transfer station 63 the microbeads are transferred from the slot 55 onto the carrier film 57. In a practical construction, the carrier film 57 has sufficient adhesive qualities, or a tacky surface, which will permit the beads 58 in the confronting slot 55 to be transferred to and held by the surface of the film 57.

After leaving the transfer station 63 the empty slot 55 is carried, by revolution of the cylinder 56 to the receiving station 62 where it is again refilled with microbeads (61). It will be seen that the transfer media 57 can comprise a continuous ribbon or strip which may be then cut or severed into discrete segments of appropriate length. Suitable sensing and counting devices may be used in conjunction with the severing mechanism to cut the continuous carrier media 57 into segments after a given number of particle segments have been counted.

In summary, the invention comprises, in its broadest aspects, means for aligning a plurality of calibration particles within a fixed volume so as to both establish a given number of such particles and to permit them to be readily verified as to count. Such aspects include the consideration that the particles may be disposed abreast of each other in terms of two, and perhaps three, adjacent rows in a slot. More than three rows does not appear to be practical. The method aspect of the invention further includes the manner of so aligning and counting calibration particles and their subsequent transfer into a system to be calibrated. It should thus become apparent that an absolute particle standard and a calibration standard for determination of the degree of contamination or cleanliness to be desired or which is found in a fluid has been discovered and perfected by this invention. The illustrations presented by way of the figures of the drawings and their corresponding descriptive materials manifest the practice of the invention and which is not necessarily limited to such embodiments, but rather extend to all other embodiments of the invention. It should be understood that the invention is one of unitary nature and not limited to the presented illustrations, as it would be obvious to one having ordinary skill in the art to make variations in the manufacture and method of this invention and still come within the scope of the appended claims.

What is claimed is:

1. A calibration standard to be used for establishing a given count of a plurality of particles of substantially uniform shape and size, comprising:
   means defining an elongated slot having a length substantially equal to $n$ times $d$ where $n$ is said given count and $d$ is the mean diameter of said particles, for receiving said plurality of particles, said slot being bounded by two confronting and uniformly spaced apart side faces, a smooth substantially planar bottom, and two end faces, both the breadth and depth of said slot being fractionally larger than the mean diameter of said particles,
   said slot defining means comprising a glass slide having said slot formed in one surface thereof.

2. A calibration standard as defined in claim 1 wherein said slot is substantially rectilinear.

3. A calibration standard as defined in claim 1 wherein said slot is of a trapezoidal cross section.

4. A calibration standard as defined in claim 1 wherein said particles are contiguously arranged and disposed in said slot and extend throughout its entire length.

5. A calibration standard to be used for establishing a given count of a plurality of particles of substantially uniform shape and size, comprising:
   means defining an elongated slot having a length substantially equal to $n$ times $d$ where $n$ is said given count and $d$ is the mean diameter of said particles, for receiving said plurality of particles, said slot being bounded by two confronting and uniformly spaced apart side faces, a smooth substantially planar bottom, and two end faces, both the breadth and depth of said slot being fractionally larger than the mean diameter of said particles,
   said particles being contiguously arranged and disposed in said slot and extending throughout its entire length, and
   a soluble substance being applied to said particles for selective retention thereof.

6. A calibration standard as defined in claim 5 wherein said soluble substance comprises:
   a film of solidified collodian.

7. A calibration standard as defined in claim 5 wherein said soluble substance comprises:
   a solid film of material soluble in an inorganic solvent.

8. A calibration standard as defined in claim 5 wherein said soluble substance comprises:
   a solid film of material soluble in an organic solvent.

9. A calibration standard to be used for establishing a given count of a plurality of particles of substantially uniform shape and size, comprising:
   means defining an elongated slot having a length substantially equal to $n$ times $d$ where $n$ is said given count and $d$ is the mean diameter of said particles, for receiving said plurality of particles, said slot being bounded by two confronting and uniformly spaced apart side faces, a smooth substantially planar bottom, and two end faces, both the breadth and depth of said slot being fractionally larger than the mean diameter of said particles,
   said particles comprising synthetic plastic beads of substantially uniform diameter and are in the size range from 1 micron to 200 microns.

10. A particle standard comprising:
    a substantially solid sheet of material soluble in a given class of solvents;
    a plurality of particles of substantially uniform dimension and substantially insoluble in said given class of solvents, said particles being combined with said solid sheet of material whereby said sheet functions as a matrix for releasably securing said particles in an ordered geometrical pattern.

11. A particle standard as defined in claim 10 wherein said sheet of material is substantially transparent.

12. A particle standard as defined in claim 11 wherein said particles are relatively opaque as compared with said sheet of transparent material.

13. A particle standard as defined in claim 10 wherein said particles have a contrasting color as compared with said sheet of material.

14. A particle standard as defined in claim 10 wherein said sheet of material is selected from the group comprising: ethyl hydroxyethyl cellulose, phenolic, and polyvinyl butryal.

15. A particle standard as defined in claim 10 wherein said sheet of material is in the form of a ribbon, having a narrow width as compared with its length, and having as its smallest dimension its thickness.

16. A particle standard as defined in claim 10 wherein said particles are spherically shaped.

17. A particle standard as defined in claim 16 wherein said particles are of substantially uniform diameter and are selected to have a size within the range from 1 micron to 200 microns.

18. A particle standard as defined in claim 10 wherein said particles comprise beads made from a substance selected from the group comprising: glass, synthetic plastic, metal, latex, and natural pollen.

19. A particle standard as defined in claim 10 wherein said ordered geometrical pattern comprises a straight line.

20. A particle standard as defined in claim 10 wherein said ordered geometrical pattern comprises a plurality of parallel lines.

21. A particle standard as defined in claim 10 including a solvent of said given class of solvents for selectively releasing said particles from said matrix by dissolving said sheet of material.

22. A particle standard as defined in claim 21 wherein said solvent is selected from the group comprising: hydrocarbons, alcohols, ketones, esters, ethers, and water.

23. Calibration apparatus comprising:
a plurality of particles of substantially uniform shape and size;
means defining an elongated groove having a dimension $d$ which is the mean diamension of said particles for receiving said plurality of particles in a contiguous arrangement extending along said groove, said groove being bounded by two confronting and uniformly spaced apart side faces and a smooth bottom, both the breadth and depth of said slot being fractionally larger than said mean dimension of said particles; and,
means for selectively transferring said contiguously arranged particles from said groove to a receiving container,
said transferring means cooperatively engaging said groove defining means only at a transfer station at which said particles initially confront said transferring means to which said particles then become held.

24. Calibration apparatus comprising:
a plurality of particles of substantially uniform shape and size;
means defining an elongated groove having a length substantially equal to $n$ times $d$ where $n$ is a given calibration number and $d$ is the mean dimension of said particles for receiving said plurality of particles in a contiguous arrangement extending throughout the entire length of said groove, said groove being bounded by two confronting and uniformly spaced apart side faces, a smooth bottom and two end faces, both the breadth and depth of said slot being fractionally larger than said mean dimension of said particles; and,
means for selectively transferring said contiguously arranged particles from said groove to a receiving container,
said groove defining means comprising a planar glass slide having said groove located in one surface thereof.

25. Calibration apparatus as defined in claim 24 wherein said groove defining means comprises:
a cylinder having said groove located in the peripheral surface thereof.

26. Calibration apparatus as defined in claim 25 including:

means for rotating said cylinder to facilitate the transfer of said particles from said groove to said container.

27. A method for establishing a calibration standard in the form of an exact given quantity of particles, comprising the steps of:
introducing a plurality of substantially uniform particles of nominal dimension into a slot having a width fractionally greater than the nominal dimension of one of said particles and a length which is an integral multiple of said nominal dimension, in a quantity sufficient to result in a contiguous relationship of said particles in said slot whereby said slot is substantially filled;
verifying while in said slot that the total number of particles said slot conforms to said exact given quantity; and,
thereafter transferring said particles to a receiving container.

28. The method as defined in claim 27 wherein said verifying step comprises optically examining the occupancy of said slot to assure that the length of said slot is filled with said particles.

29. The method as defined in claim 27 wherein said verifying step includes:
counting the number of said particles in said slot to ascertain conformance with said exact given quantity.

30. The method as defined in claim 27 wherein said transferring step comprises:
flushing said particles from said slot into said container by means of a supply of flushing fluid.

31. The method as defined in claim 27 wherein said container comprises a soluble solidified carrier.

32. The method as defined in claim 27 wherein said slot is substantially rectilinear and is formed in one surface of a glass slide.

33. The method as defined in claim 27 wherein said slot is substantially rectilinear and is formed in the peripheral surface of a rotatable cylinder.

34. The method as defined in claim 27 including the step of:
combining said plurality of particles with a soluble thixotropic medium prior to said introducing step to facilitate the transfer of said particles into said slot.

35. The method of producing a particle calibration standard comprising the steps of:
conglomerating a plurality of substantially uniform particles with a sufficient amount of viscous medium to facilitate the temporary transportation of said particles;
introducing a first quantity of said conglomerated particles into a measuring slot having precisely predetermined dimensions by means of which a predetermined second quantity of said first quantity of conglomerated particles, which is equal to or less than said first quantity, is arranged into a contiguous relationship so as to substantially fill said slot;
accurately counting all said contiguously related particles in said slot to establish a known calibration quantity; and,
thereafter removing all of said particles from said slot while separating said particles from said viscous medium whereby said calibration quantity of particles may be selectively transferred to a receiving container to constitute an absolute particle calibration standard.

36. The method as defined in claim 35 wherein said particles are of substantially uniform diameter and are in the size range of 1 micron to 200 microns.

37. The method as defined in claim 35 wherein said introducing step comprises wiping said first quantity of conglomerated particles across and into said slot by means of a spatula.

38. The method as defined in claim 35 wherein said viscous medium is soluble and wherein said removing step includes dissolving said viscous medium in a solvent.

39. The method as defined in claim 38 wherein said particles comprise beads which are insoluble in said solvent.

40. The method as defined in claim 39 wherein said removing step includes the flushing of said particles from said slot by means of a jet of liquid solvent.

41. The method as defined in claim 35 wherein said removing step includes the flushing of said particles from said slot by means of a jet of gas.

42. The method as defined in claim 35 wherein said receiving container comprises a sample bottle.

43. The method as defined in claim 35 wherein said receiving container comprises a ribbon of material having a surface to which the separated particles adhere.

44. The method as defined in claim 35 in which said container comprises a ribbon of soluble material cast in place onto said contiguously arranged particles.

45. The method as defined in claim 35 wherein said slot is substantially rectangular.

46. The method as defined in claim 45 wherein said slot is formed in the surface of a planar glass slide.

47. The method as defined in claim 45 wherein said slot is formed in the peripheral surface of a cylinder.

48. The method as defined in claim 35 wherein said slot comprises a capillary tube the interior diameter of which is fractionally larger than the mean dimension of said particles.

49. The method as defined in claim 35 including the step of:
emptying said receiving container into a system to be calibrated.

50. A calibration standard establishing a given count of a plurality of particles of substantially uniform shape and size, comprising:
means defining an elongated slot having a length substantially equal to $n$ times $d$ where $n$ is said given count and $d$ is the mean diameter of said particles, for receiving said plurality of particles, said slot being bounded by two confronting and uniformly spaced apart side faces, a smooth substantially planar bottom, and two end faces, the depth of said slot being fractionally larger than twice the mean diameter of said particles,
said slot defining means comprising a glass slide having said slot formed in one surface thereof.

51. The standard of claim 50 in which the breadth of said slot is at least twice the mean diameter of said particles.

52. Calibration apparatus as defined in claim 23 wherein said transferring means is a film carrier.

53. Calibration apparatus as defined in claim 23 wherein said groove defining means comprises a cylinder having said groove located in the peripheral surface thereof.

54. Calibration apparatus as defined in claim 53 wherein said groove is oriented circumferentually on the peripheral surface of said cylinder.

55. Calibration apparatus as defined in claim 54 including means for rotating said cylinder to facilitate the transfer of said particles from said groove to said container.

56. Calibration apparatus as defined in claim 53 wherein said groove is one of a plurality of spaced grooves each one of which is oriented on the peripheral surface of said cylinder in parallel relationship to the axis of said cylinder.

57. Calibration apparatus as defined in claim 56 including means for rotating said cylinder to facilitate the transfer of said particles from said groove to said container.

58. A calibration standard to be used for establishing a given count of a plurality of particles of substantially uniform shape and size, comprising:
means defining an elongated slot having a length substantially equal to $n$ times $d$ where $n$ is said given count and $d$ is the mean diameter of said particles, for receiving said plurality of particles, said slot being bounded by two confronting and uniformly spaced apart side faces, a smooth substantially planar bottom, and two end faces, the depth of said slot being fractionally larger than the mean diameter of said particles, the breadth of said slot being fractionally larger than twice the mean diameter of said particles,
said particles comprising synthetic plastic beads of substantially uniform diameter and are in the size range from 1 micron to 200 microns.

* * * * *